(12) United States Patent
Mallary

(10) Patent No.: US 7,234,227 B1
(45) Date of Patent: Jun. 26, 2007

(54) METHODS FOR CENTERING DISKS IN A MAGNETIC DISK ASSEMBLY

(75) Inventor: Michael Mallary, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 318 days.

(21) Appl. No.: 10/630,265

(22) Filed: Jul. 30, 2003

(51) Int. Cl.
*G11B 5/127* (2006.01)
*H04R 31/00* (2006.01)

(52) U.S. Cl. .............................. 29/603.04; 29/603.03; 360/98.05; 360/99.08; 360/99.12; 360/270; 360/271

(58) Field of Classification Search ............. 29/603.03, 29/603.04; 360/98.05, 99.08, 99.12, 270, 360/271
See application file for complete search history.

(56) References Cited

U.S. PATENT DOCUMENTS 5,101,306 A * 3/1992 Johnson .................... 360/98.08
5,333,080 A * 7/1994 Ridinger et al. ......... 360/99.12
5,548,454 A * 8/1996 Kawakubo et al. ........ 360/72.1

FOREIGN PATENT DOCUMENTS

JP        63167467 A  *  7/1988

OTHER PUBLICATIONS

"Investigation of the effect of hard disk drive unbalance on repeatable and nonrepeatable runout"; Hredzak, B.; Guo, G.; Zhang, J.; Power Electronics and Drive Systems, 2003; Nov. 17-20, 2003; pp. 1359-1363.*

* cited by examiner

*Primary Examiner*—Paul Kim
(74) *Attorney, Agent, or Firm*—Myers Bigel Sibley & Sajovec, PA

(57) ABSTRACT

An apparatus and a method are provided to facilitate building of a disk stack for inclusion in a magnetic disk drive. A spindle is provided which comprises first and second disk contacts. A mechanism is provided to bias an inner diameter of a stack of plural disks toward both the first disk contact and the second disk contact. The spindle may comprise one or a pair of lateral protrusions. The apex of each such spindle lateral protrusions may comprise one or both of the disk contacts. In addition, or alternatively, the inner diameter of a disk, to be inserted over the spindle, may comprise one or a pair of lateral protrusions. The apexes of such disk lateral protrusions may comprise one or both of the first disk contact and the second disk contact.

5 Claims, 4 Drawing Sheets

METHODS FOR CENTERING DISKS IN A MAGNETIC DISK ASSEMBLY

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

BACKGROUND OF THE INVENTION

1. Field of the Invention

The present invention relates to magnetic disk drives, and methods for forming a disk stack assembly with concentrically-aligned disks.

2. Description of Background Information

Magnetic disk drives store data for use by all types of computer systems. A magnetic disk drive typically has a case, enclosing one or more spinning disks (also known as "platters"), arranged one on top of another in a stack. An actuator arm of the hard disk drive responds to commands the drive receives from a host computer, and the actuator arm moves to a proper location on the disk. When the actuator arm arrives at the proper location, a read/write head attached to the actuator arm either reads data from or writes data to the location.

A typical magnetic disk drive comprises a series of aluminum alloy disks. Although some magnetic disk drives use only a single disk, most use a plurality of disks. The disks have a central opening. The disks comprise a substrate material that forms the bulk of the disk, and a magnetic media coating which holds the magnetic pattern that represents the data.

The disks may be mounted on a common central spindle to form a disk stack assembly that spins as one piece. The disk stack assembly may comprise a spacer ring between adjacent disks on the spindle. The spacer ring provides a longitudinal separation between adjacent disks.

It is important to center the disks on the spindle so that they do not cause an imbalance and excessive vibration when rotated at high speeds. An out-of-balance condition in the rotating disk stack assembly can cause erratic speed variations in the movement of the disks in relation to the read/write heads, which may produce read/write errors. Vibrations of the rotating disks can also contribute to head crashes, harming both the disk and read/write head.

There are known processes for centering and balancing disks when securing them to the spindle of a disk stack assembly. In one such stack assembly build process, the inner diameter (ID) of a central opening of each disk is specified to have some value (e.g., two mils) greater than that of the outer diameter (OD) of the spindle. This ID-OD difference between the ID of the disk and the OD of the spindle is chosen to prevent the disk from binding to the spindle even when there is a slight lack of perpendicularity between the disk and the axis of the spindle during assembly. An averaging procedure is employed to cancel offsets of disks against each other. In this process, these parts may be misaligned by up to approximately one mil. For some high-performance products, this misalignment is reduced by employing a dynamic balancing process.

SUMMARY OF THE INVENTION

The present invention is directed to an apparatus or method (or any one or more subparts thereof) for centering a plurality of disks in a disk stack of a magnetic disk drive.

In accordance with one aspect of the invention, an apparatus is provided for building a disk stack for inclusion in a magnetic disk drive. A spindle is provided which comprises first and second disk contacts. A mechanism is provided to bias an inner diameter of a stack of plural disks toward both the first disk contact and the second disk contact.

In accordance with another aspect of the invention, an apparatus or method is provided for building a disk stack for inclusion in a magnetic disk drive. The invention may be directed to any one or more subparts of such an apparatus or method, or to a resulting magnetic disk drive. A spindle is provided comprising a given outer diameter. Plural stacked disks having inner sleeve-like openings are provided. The inner sleeve-like openings have a given inner diameter slightly larger than the outer diameter of the spindle. Longitudinal spacers are provided to provide spaces between sets of adjacent disks mounted to the spindle, along the length of the spindle. A disk alignment mechanism is provided. The disk alignment mechanism comprises lateral protrusions defining at least two lateral spacing points of contact and a biasing mechanism to bias a side of the spindle toward a corresponding part of an inner diameter of the plural stacked disks, whereby the outer diameter of the spindle and the inner diameter of the plural stacked disks contact each other at the two lateral spacing points of contact.

BRIEF DESCRIPTION OF THE DRAWINGS

The present invention is further described in the detailed description which follows, by reference by the noted drawings by way of non-limiting exemplary embodiments, in which like reference numerals represent similar parts throughout the several views of the drawings, and wherein.

DETAILED DESCRIPTION

Figure 1:
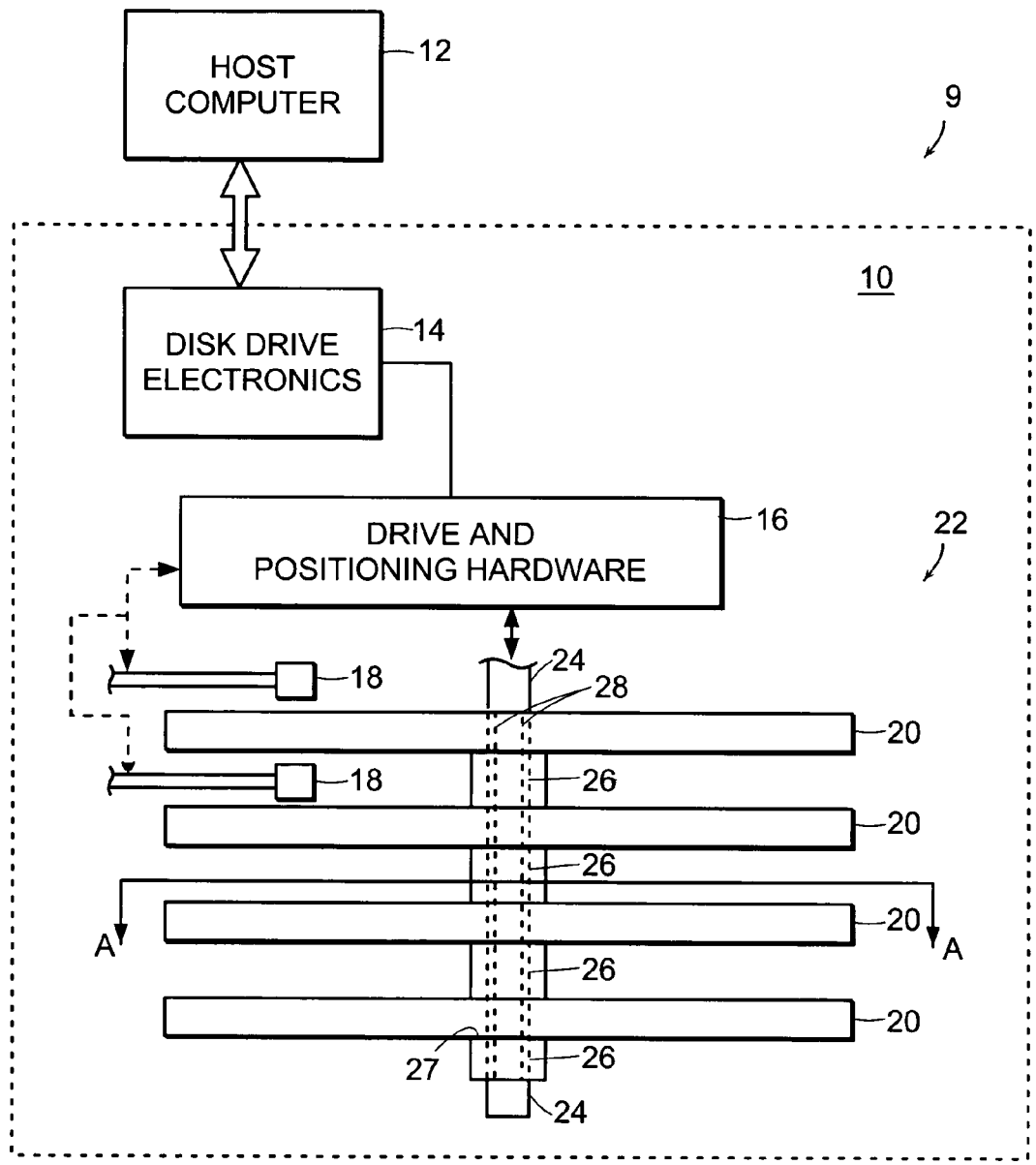
FIG. 1 is a schematic diagram of a computer system comprising a magnetic disk drive assembled in accordance with an embodiment of the present invention.

Referring now to the drawings in greater detail, FIG. 1 shows a schematic diagram of a computer system 9. The illustrated computer system 9 comprises a host computer 12, coupled to a magnetic disk drive 10. Host computer 12 may comprise an individual computer such as a personal computer or a server, or it may comprise a network of computers. Magnetic disk drive 10, having a housing depicted schematically by a square-shaped dotted line, may be installed within a given computer, for example, by plugging magnetic disk drive 10 into a SCSI adapter provided within host computer 12.

Magnetic disk drive 10 comprises disk drive electronics 14 coupled to host computer 12 via, for example, an adapter such as a SCSI adapter. Drive and positioning hardware 16 is coupled to disk drive electronics 14. Drive and positioning hardware 16 comprises, among other elements not specifically shown in FIG. 1, a read/write head 18 for each disk media surface of each disk provided in a disk stack. In the magnetic disk drive 10 shown in FIG. 1, a disk stack 22 is provided which comprises a plurality of individual disks 20. Four individual disks are shown in FIG. 1, although less or more individual disks may be provided in a given magnetic disk drive. Individual disks 20 are fixed to or clamped onto a spindle 24. Spacer rings 26 are provided between adjacent individual disks 20.

A disk stack 22 may be formed by bracing spindle 24 on a spindle holding mechanism and placing an initial spacer ring 26 on spindle 24. Each spacer ring 26 comprises an inner diameter (ID), which is slightly larger than an outer diameter (OD) of the cylindrical spindle 24. A first individual disk 20 is then placed over spindle 24 and abuts the initial spacer ring 26, at an inner sleeve portion 27 of individual disk 20.

An additional spacer ring 26 is then placed after the first individual disk 20 over spindle 24. This process is repeated until a desired or requisite number of individual disks 20 and spacer rings 26 (as needed) are accumulated to form a complete disk stack 22.

In the embodiment shown in FIG. 1, spindle 24 is provided with lateral protrusions 28 which run along the outer surface of spindle 24, in parallel to each other and in a longitudinal direction parallel to the longitudinal axis of spindle 24.

Figure 2:
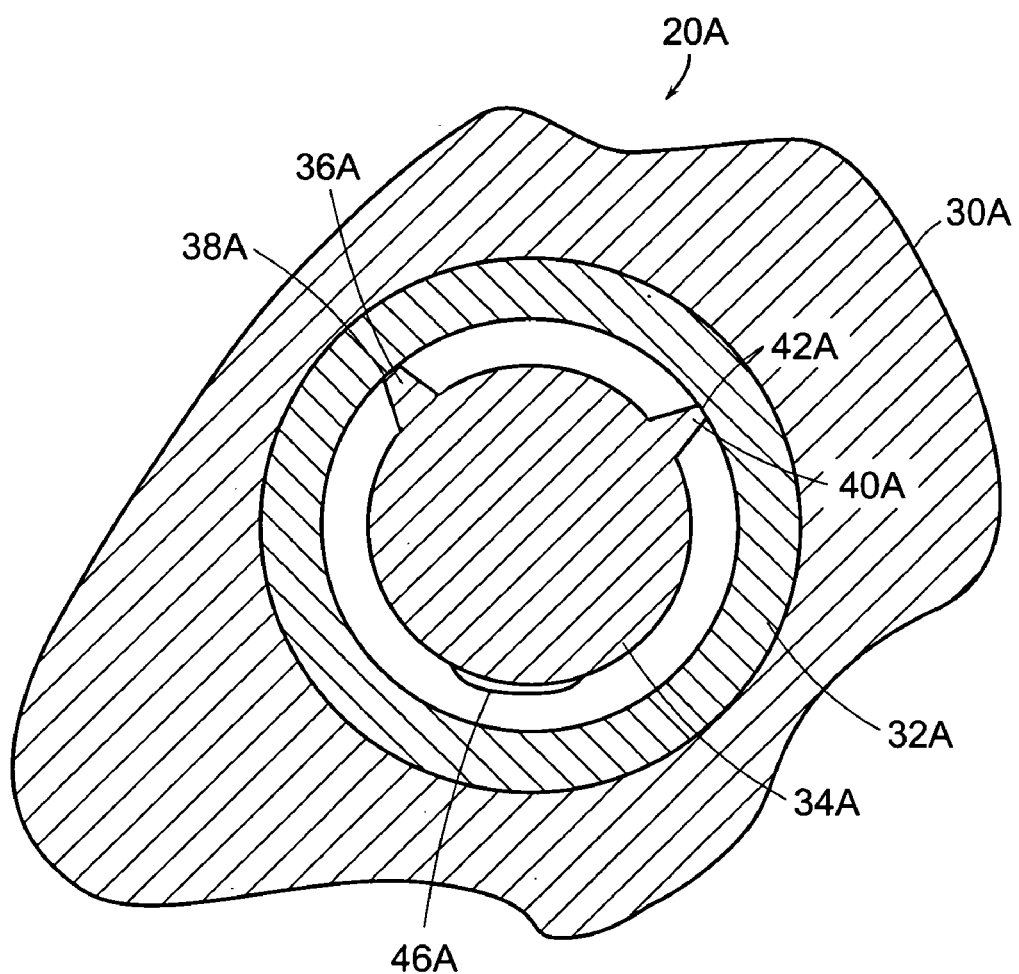
FIGS. 2, 3, and 4 are cross-sectional views of the disk stack assembly shown in FIG. 1, taken along the line A—A, with different lateral protrusion structures in accordance with different embodiments.

FIG. 2 is a top sectional view of a given individual disk 20a, taken along the lines A—A from the apparatus shown in FIG. 1. Note that FIGS. 3 and 4 are variations on the structure shown in FIG. 2, taken along the same sectional lines.

As shown in FIG. 2, a given individual disk 20a, a portion of which is shown in FIG. 2, is provided, and is mounted on spindle 34a. Spindle 34a comprises first and second disk contacts. Specifically, spindle 34a comprises a first lateral protrusion 36a (shown in FIG. 1 as one of the lateral protrusions 28) and a second lateral protrusion 40a (shown in FIG. 1 as the other of the lateral protrusions 28) which extend from an inner diameter portion 32a of disk 20a. First lateral protrusion 36a comprises an apex which defines a lateral spacing point of contact 38a. Second lateral protrusion 40a comprises an apex which defines a lateral spacing point of contact 42a. An inner diameter of individual disk 20a is in contact with each of lateral spacing points of contact 38a and 42a. A balancing weight may be provided. In the embodiment illustrated in FIG. 2, a balancing weight 46a is provided at a location on the outer surface of spindle 34, opposite the locations of lateral protrusions 36a and 40a. The location and structure of balancing weight 46a are not the subject of the invention as described herein, and may be implemented with any technology known to or developed by the artisan. Thus, for example, an overall balancing method or mechanism may be utilized to ensure an overall balance of disk stack 22, without specific individual balancing weights 46a as shown in FIG. 2. The specific size and location of balancing weight 46a may be determined by using balancing methods to ensure that the weight of lateral protrusions 36a and 40a are offset by balancing weight 46a. Alternatively, resesses may be employed in certain areas of spindle 34a in order to offset the additional weight of lateral protrusions 36a and 40a, without providing any additional balancing weight such as balancing weight 46a shown in FIG. 2

Figure 3:
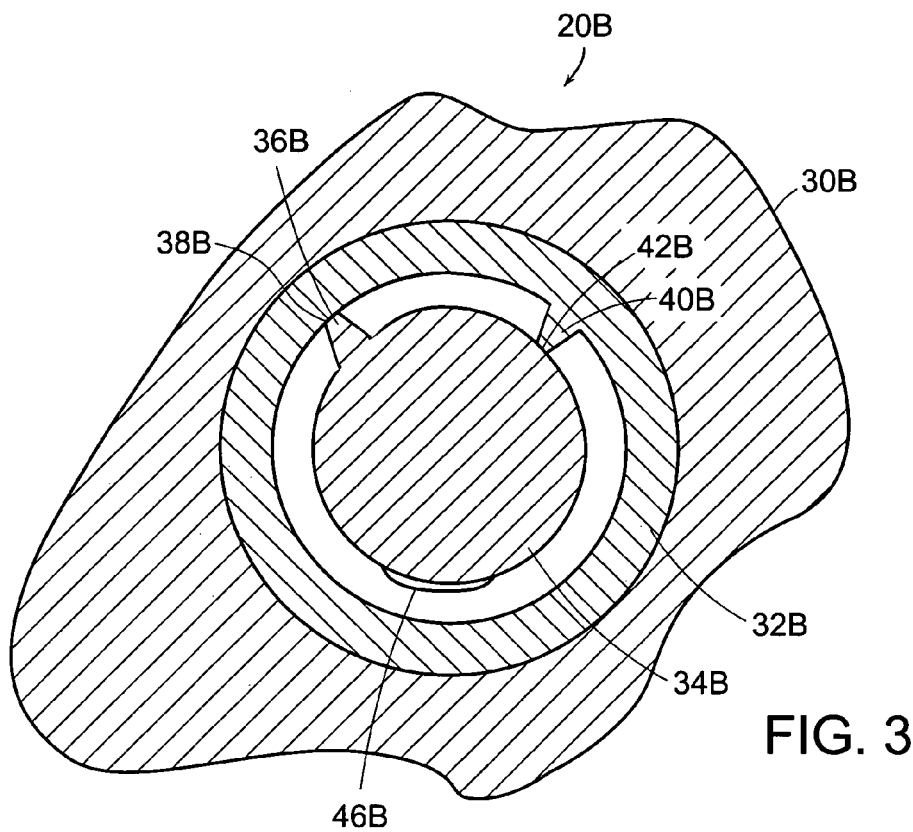
Figure 4:
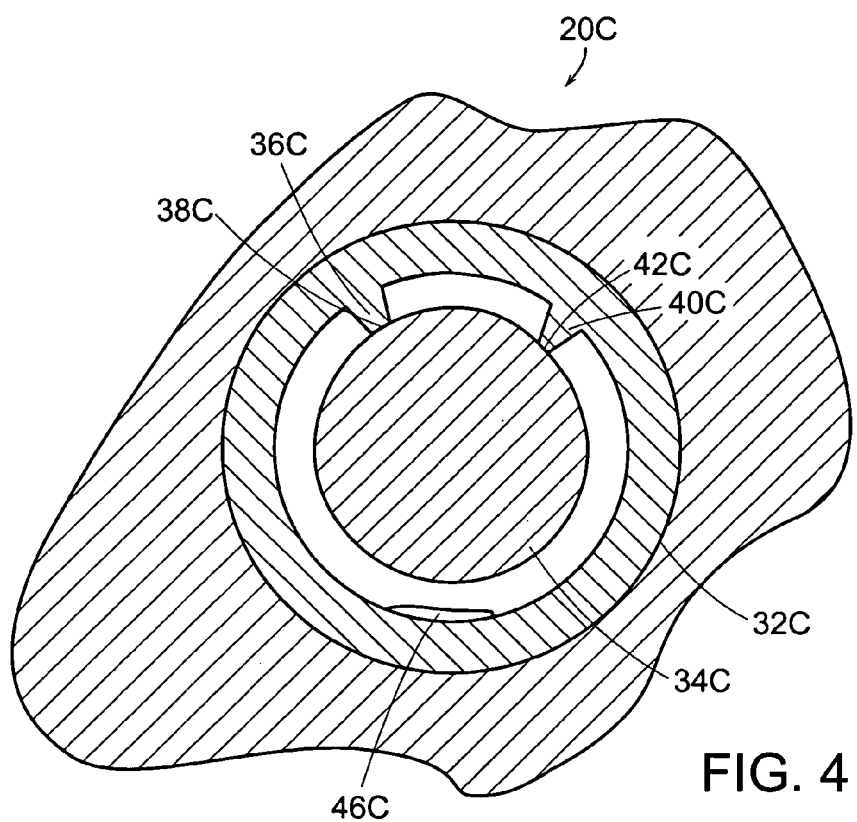

Balancing weights 46b and 46c are shown in FIGS. 3 and 4 for similar purposes, and similar variations of such balancing mechanisms can be provided. In the embodiment illustrated in FIG. 3, the balancing weight 46b is provided at a location on the outer surface of spindle 34b. In the embodiment illustrated in FIG. 4, the balancing weight 46c is provided at a location on the inner diameter of disk 20c.

A mechanism (e.g., the apparatus shown in FIG. 5) may be utilized to bias an inner diameter of individual disk 20a toward each of the lateral spacing points of contact 38a and 42a. The radial distance from the central longitudinal axis of spindle 34a to the lateral spacing points of contact 38a and 42a (which comprise the apexes of the corresponding lateral protrusions 36a and 40a) is approximately equal to the radial distance from the longitudinal axes of each disk 20a to the inner diameter surface of that individual disk.

Longitudinal spacers may be provided to provide spaces between sets of adjacent disks mounted to the spindle along the length of the spindle. In the specific embodiment shown in the figures, the longitudinal spacers comprise separate sleeve-like members. Specifically, those members may comprise rings. The illustrated sleeve-like members have an inner diameter slightly larger than the outer diameter of the spindle.

In operation, the apparatus of FIGS. 1 and 2 can serve the purpose of allowing for the building of a disk stack for inclusion in a magnetic disk drive 10 as shown in FIG. 1. The apparatus comprises a spindle 34a comprising a given outer diameter, and plural stacked disks 20a having inner sleeve-like openings with a given inner diameter slightly larger than the outer diameter of the spindle. Longitudinal spacers are provided, such as spacer rings 26, to provide spaces between sets of adjacent platters mounted to the spindle along the length of the spindle. A disk alignment mechanism is provided, which comprises the lateral protrusions 36a and 40a defining at least two lateral spacing points of contact 38a and 42a. A biasing mechanism, such as a mechanism that uses gravity such as that shown in FIG. 5, (or any other biasing mechanism which serves the same function) may be provided to bias a side of spindle 34a toward a corresponding part of an inner diameter of the disks 20a, whereby the outer diameter of spindle 34a and the inner diameter of the plural stacked disks 20a contact each other at the two lateral spacing points of contact.

In FIG. 2, the outer surface of the spindle comprises two lateral protrusions protruding radially outwardly and extending longitudinally along the outer surface of spindle 34a. Apex portions of lateral protrusions 36a and 40a comprise the two lateral spacing points of contact 38a and 42a. In the illustrated embodiment, the distance between the lateral protrusions (defined in terms of a radial angle with respect to the central longitudinal axis of spindle 34) is 120°. Alternatively, the distance can be a value ranging from 60 to 150. Further alternate distances may be utilized in accordance with variations of the invention described herein. For example, larger distances or smaller distances may exist between the pair of lateral protrusions. Alternatively, more than two lateral protrusions may be provided, so long as the objective of providing concentric alignment of the spindle in relation to each of disks 20a is served.

In FIG. 3, a given individual disk 20b is shown where a side of a spindle 34b is biased toward a corresponding part of the inner diameter of disk 20b, whereby the outer diameter of spindle 34b and the inner diameter of disk 20b contact each other at two lateral spacing points of contact 38b and 42b. In the embodiment shown in FIG. 3, the inner diameter portion 32b of disk 20b comprises a disk lateral protrusion 40b protruding radially inwardly. An apex portion of disk lateral protrusion 40b comprises a first of the two lateral spacing points of contact 42b. The outer surface of spindle 34b comprises a spindle lateral protrusion 36b protruding radially outwardly and extending longitudinally along the outer surface of the spindle 34b. An apex portion of spindle lateral protrusion 36b comprises a second of the two lateral spacing points of contact 38b. In the specific embodiment shown in FIG. 3, the distance between the protrusions is 120°. However, the distance between these protrusions may be varied as described above with respect to FIG. 2, and additionally protrusions may be provided.

In the embodiment shown in FIG. 4 a disk 20c is biased toward a spindle 34c. Specifically, a side of spindle 34c is biased toward a corresponding part of an inner diameter portion 32c of disk 20c, whereby the outer diameter of spindle 34c and the inner diameter of disk 20c contact each other at two lateral spacing points of contact 38c and 42c. Specifically, the inner diameter of disk 20c comprises two lateral protrusions 36c and 40c protruding radially inwardly. Apex portions of those lateral protrusions 36c and 40c comprise the two lateral spacing points of contact 38c and 42c.

The distance between protrusions 36c and 40c can be as described above with respect to each of the embodiments of FIGS. 2 and 3, and the number of such protrusions can be varied in the same manner.

Figure 5:
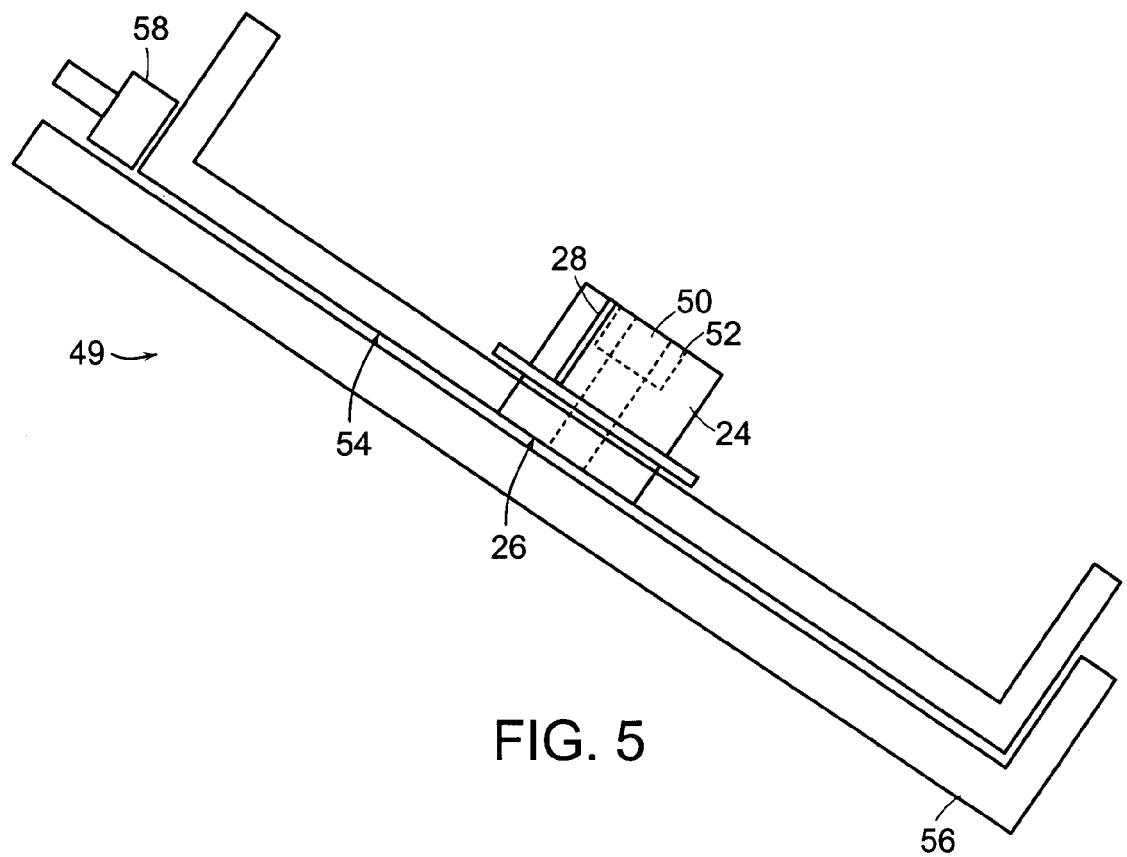
FIG. 5 is a side view of one embodiment of a tilted mounting fixture.

FIG. 5 is a side view of a tilted mounting fixture 49, which serves as a mechanism to bias an inner diameter of a stack of one or more disks toward the first and second disk contacts. Specifically, the first and second disk contacts may be formed using any of the structures shown in FIG. 2, 3, or 5. FIG. 5 shows a tilted mounting fixture 49 for holding a spindle 24 mounted to a disk drive base plate 54, at an angle so that the force of gravity will bias a side of the inner diameter of each disk toward an appropriate side of the outer diameter of spindle 24 so as to cause the inner diameter of the disks and the outer diameter of the spindle to contact each other at the two lateral spacing points of contact.

As shown in FIG. 5, a spindle 24 is mounted to a disk drive base plate 54, which is supported by a tilted base 56 and a fixture clamp 58. Spindle 24 is mounted within disk drive base plate 54 at a spindle mounting flange 26. Protrusions 28 are provided on the outer portion of spindle 24. Spindle 24 is mounted about a fixed shaft 50, fixed to disk drive base plate 54, and is rotatable about a spindle bearing 52, which facilitates rotation of spindle 24 about fixed shaft 50.

Fixture clamp 58 fastens base plate 54 to tilted base 56. In the illustrated embodiment, tilted fixture 49 is configured so that spindle 24 is at a 45 angle. Should spindle 24 comprise one or a pair of lateral protrusions 28, those protrusions will be directed toward the top of the surface of the outer diameter of spindle 24, so that gravity will force the corresponding portion of the inner diameter of each disk against such lateral protrusion or protrusions. Should each disk 20 comprise one or a pair of lateral protrusions, those disks will be rotated and positioned such that protrusion or pair of protrusions will abut the upper outer surface of the outer diameter of spindle 24.

Figure 6:
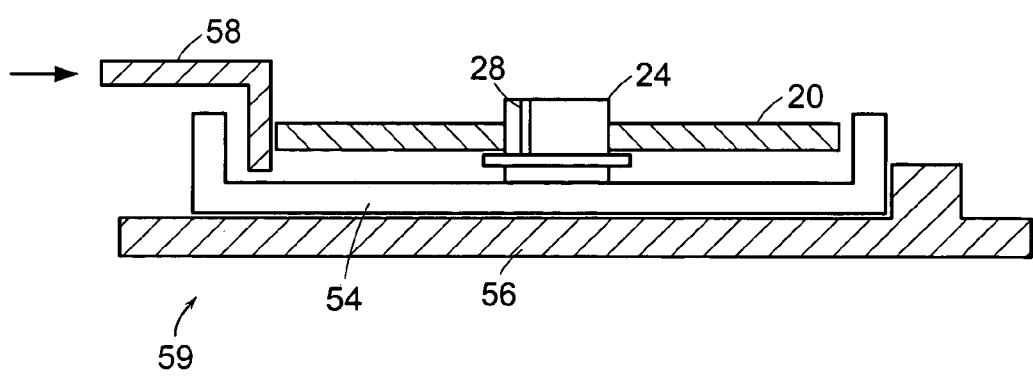
FIG. 6 is a side view of an embodiment of a flat mounting fixture.

FIG. 6 is a side view of a flat mounting fixture, which is horizontal. A spindle 24 is mounted to a base plate 54, and may comprise one or a pair of protrusions 28. A disk 20 is shown in FIG. 6. A pusher 58 is provided to push disk 20 in a lateral direction—to the right as viewed in FIG. 6. Should spindle 24 comprise one or a pair of lateral protrusions 28, those protrusions will be directed to the left side of flat mounting fixture 59, so that pusher 58 will push the corresponding portion of the inner diameter of each disk 20 against such lateral protrusion or protrusions. Should each disk 20 comprise one or a pair of lateral protrusions, those disks will be rotated and positioned such that the protrusion or pair of protrusions will abut the left side outer surface of the outer diameter of spindle 24.

In implementation, with any of these structures of FIG. 2, 3 or 4, a disk stack assembly may be formed with concentricity sigmas of about 0.1 mils. (a standard tolerance for precision machined parts). In the embodiments shown, the extent to which each lateral protrusion extends beyond its base surface may be on the order of 2 mils., an amount that corresponds to a value of the tolerance for the ID-OD difference.

While the invention has been described with reference to certain illustrated embodiments, the words which have been used herein are words of description, rather than words of limitation. Changes may be made, within the purview of the appended claims without departing from the scope and the spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method for building a disk stack for inclusion in a magnetic disk drive, the method comprising:
   providing a spindle;
   mounting on the spindle at least two disks having inner diameter openings slightly larger than an outer diameter of the spindle, longitudinal spacers providing spaces between pairs of adjacent disks mounted to the spindle along a portion of the length of the spindle, wherein at least two of the disks have an inner diameter surface that forms at least two lateral protrusions that protrude radially inward toward the spindle; and
   biasing the disks toward a side of the spindle so that apex portions of the at least two lateral protrusions contact an outer diameter surface of the spindle at lateral spacing points of contact.

2. The method according to claim 1, wherein an angle between an adjacent pair of the at least two lateral protrusions is 120°.

3. The method according to claim 1, wherein an angle between an adjacent pair of the at least two lateral protrusions is from 60° to 150°.

4. The method of claim 1, wherein biasing the disks toward a side of the spindle so that apex portions of the at least two lateral protrusions contact an outer diameter surface of the spindle at lateral spacing points of contact comprises:
   holding the spindle at a tilted non-zero angle relative to horizontal; and
   arranging the disks so that the at least two lateral protrusions of the at least two disks protrude downward relative to horizontal and weight of the disks biases the disks toward the spindle so that the apex portions of the at least two lateral protrusions contact the outer diameter surface of the spindle at lateral spacing points of contact.

5. The method according to claim 4, wherein the spindle is held at a 45° angle relative to horizontal.

* * * * *